United States Patent
Inglish

(10) Patent No.: US 7,992,931 B1
(45) Date of Patent: Aug. 9, 2011

(54) ADJUSTABLE MOTORCYCLE-MOUNTED BACK SUPPORT

(76) Inventor: Howard Inglish, Elk Grove, CA (US)

(*) Notice: Subject to any disclaimer, the term of this patent is extended or adjusted under 35 U.S.C. 154(b) by 63 days.

(21) Appl. No.: 11/866,319

(22) Filed: Oct. 2, 2007

Related U.S. Application Data

(60) Provisional application No. 60/827,812, filed on Oct. 2, 2006.

(51) Int. Cl.
*A47C 7/02* (2006.01)
*B62J 1/00* (2006.01)

(52) U.S. Cl. ............ 297/215.12; 297/230.1; 297/215.11; 297/352

(58) Field of Classification Search ............... 297/230.1, 297/352, 215.11, 215.12
See application file for complete search history.

(56) References Cited

U.S. PATENT DOCUMENTS

| | | | |
|---|---|---|---|
| 4,313,639 A | | 2/1982 | Ware |
| 4,953,911 A | * | 9/1990 | Hanagan ................ 297/215.12 |
| 5,975,230 A | * | 11/1999 | Bourget ...................... 180/225 |
| 6,135,473 A | | 10/2000 | Wright |
| 6,206,399 B1 | | 3/2001 | Schnitzenbaumer |
| 6,390,220 B1 | | 5/2002 | Galbraith et al. |
| 6,659,547 B2 | | 12/2003 | Petersen |
| 6,840,344 B2 | | 1/2005 | Galbraith et al. |
| 6,971,714 B1 | * | 12/2005 | Hanagan ................ 297/215.12 |
| 7,021,708 B2 | | 4/2006 | Renner |
| 2004/0256897 A1 | | 12/2004 | Ziegler |

* cited by examiner

*Primary Examiner* — Sarah B McPartlin
(74) *Attorney, Agent, or Firm* — John P. O'Banion

(57) ABSTRACT

An adjustable back support assembly with a cushioning pad for use with a motorcycle is disclosed. The angle of support is adjustable, and the back support and cushioning pad of varying sizes may be used with the assembly. The assembly is attached to the motorcycle using stock holes present in the rear fender and requires little or no disassembly of the motorcycle to install. The assembly is shaped to complement the styling of the motorcycle and is removable without damaging the paint or finish.

8 Claims, 4 Drawing Sheets

ADJUSTABLE MOTORCYCLE-MOUNTED BACK SUPPORT

CROSS-REFERENCE TO RELATED APPLICATIONS

This application claims priority to U.S. provisional patent application no. 60/827,812, filed on Oct. 2, 2006, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a back support assembly for a motorcycle, and more particularly, to an adjustable back support assembly that is easy to install and remove, can be customized to fit a rider, and which does not mar the paint or finish of the motorcycle.

2. Description of Related Art

Typically, motorcycle back supports, when present, are provided for passengers, rather than primary riders, and referred to as "sissy bars". Installation requires mounting and assembly of various parts and disassembly of much of the back fender region of the motorcycle, and often results in damage to the paint or the finish. After installation, the back support is not always aesthetically pleasing and requires significant effort to remove.

BRIEF SUMMARY OF THE INVENTION

The present invention is directed to an adjustable back support assembly for a motorcycle having a cushioning pad. The pad is available in many sizes and is replaceable. The back support assembly is easily mounted to the back fender of a motorcycle, using holes in the back fender that are pre-drilled on several makes and models of motorcycles. The contours of the back support assembly are machined to match the styling of the various makes and models of motorcycles, and exhibit clean, simple joints. Removing the back support assembly does not result in damage to the motorcycle.

An aspect of the invention is an attachment for a motorcycle, comprising: a mounting plate; a substantially planar backbone coupled to the mounting plate; and a support member coupled to the backbone; wherein the mounting plate is shaped to match the curvature of a rear fender of the motorcycle; wherein the backbone is coupled to the mounting plate parallel to a long axis of the mounting plate and in a perpendicular orientation relative to the mounting plate; and wherein the support member is coupled to the backbone in a perpendicular orientation to a long axis of the backbone.

One embodiment of this aspect further comprises a pad attached to the support member. In another embodiment of this aspect, the mounting plate comprises at least one mounting hole corresponding to pre-drilled holes in the rear fender of the motorcycle. In another embodiment of this aspect, the mounting plate comprises at least one mounting hole corresponding to pre-drilled holes under a seat portion of the motorcycle.

In yet another embodiment of this aspect, the support member is replaceable and the support member is available in a plurality of sizes. In another embodiment of this aspect, the backbone further comprises: a lower curved portion; wherein the lower curved portion of the backbone has the same curvature of the mounting plate; and wherein the lower curved portion is continuous. In another embodiment of this aspect, the support member is oval-shaped. In another embodiment of this aspect, the attachment is constructed of billet aluminum.

Another aspect of the invention is a method for attaching a support to a motorcycle, comprising: aligning a mounting plate over a rear fender of the motorcycle; securing the mounting plate to the rear fender of the motorcycle; attaching a substantially planar backbone to the mounting plate such that the backbone is parallel to a long axis of the mounting plate and the backbone is perpendicular to the mounting plate; mounting a support member to the backbone such that the backbone is perpendicular to a long axis of the backbone.

In one embodiment of this aspect, the attaching step couples the mounting plate to one or more pre-drilled holes in the fender; and the pre-drilled holes are located under a seat portion of the motorcycle or on a top portion of said fender.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1A through FIG. 8. It will be appreciated that the apparatus may vary as to configuration and as to details of the parts, and that the method may vary as to the specific steps and sequence, without departing from the basic concepts as disclosed herein.

Figure 1A:
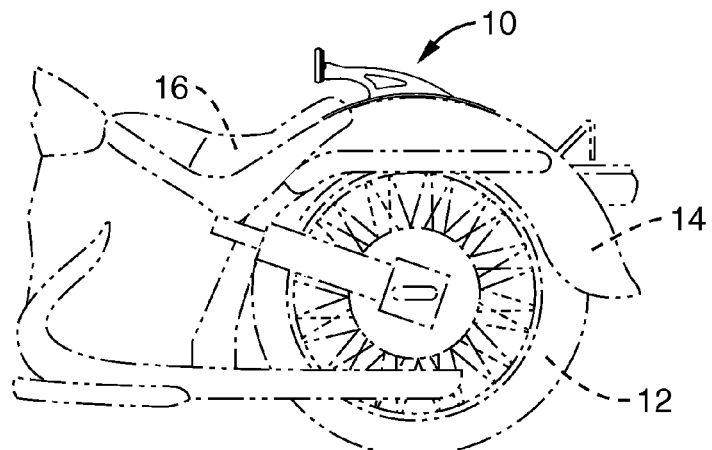
FIGS. 1A-1C show an embodiment of a back support assembly of the instant invention as installed on a motorcycle using various adjustment options.
Figure 1B:
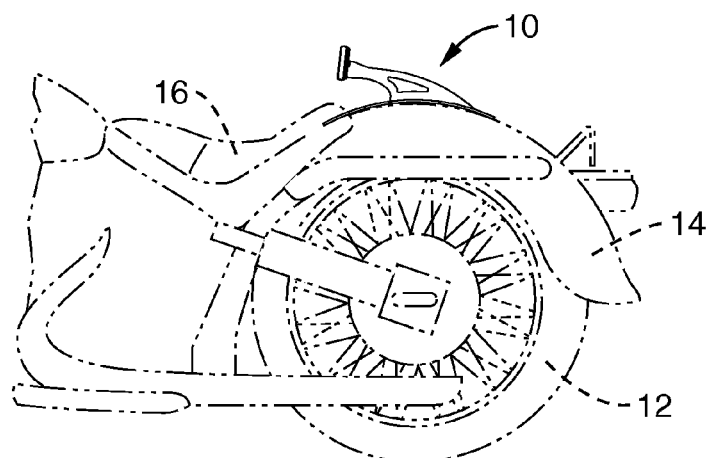
Figure 1C:
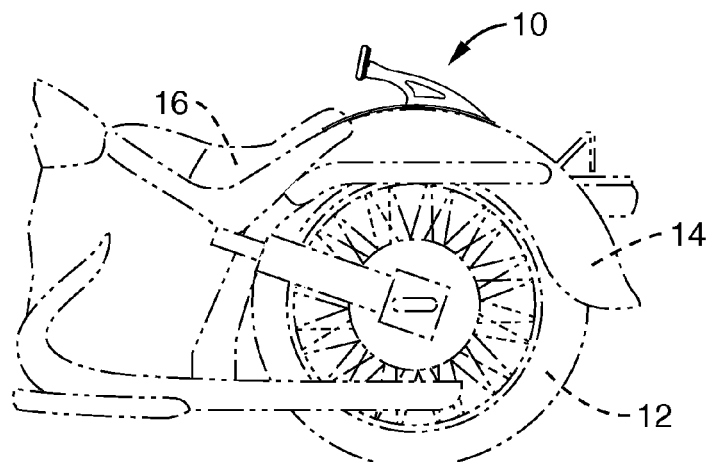
Figure 2:
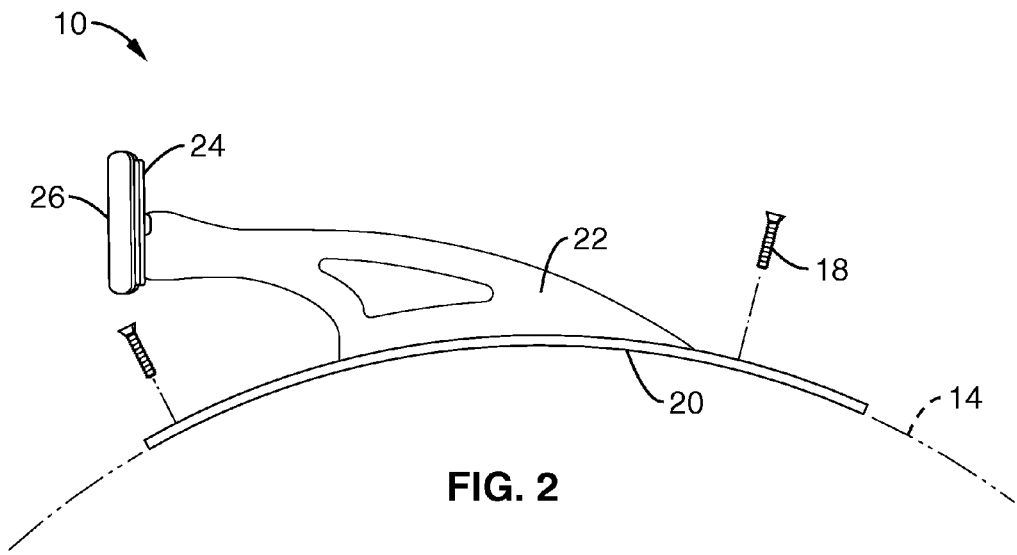
FIG. 2 is a side view of an embodiment of a back support assembly according to the instant invention, showing the manner in which it attaches to a motorcycle.

FIGS. 1A-1C show the back support assembly 10 of the present invention attached to a motorcycle 12. The back support assembly 10 is attached to the rear fender 14 adjacent to the seat 16, using screws 18, as shown in FIG. 2. Although the back support assembly is designed for use with a solo seat, it is the dimensions of the rear fender 14 that limit its placement. Many motorcycles have stock holes pre-drilled through the rear fender, with two located beneath the seat 16 and a third present at the top of the fender 14. Installation of the back support assembly 10 is no more complicated than removing the seat 16 to access these stock holes. Because riders often must open or remove the seat 16 to secure helmets, or to access, remove, or charge the battery, installing the back support assembly 10 does not require complicated or unfamiliar manipulations.

Figure 3:
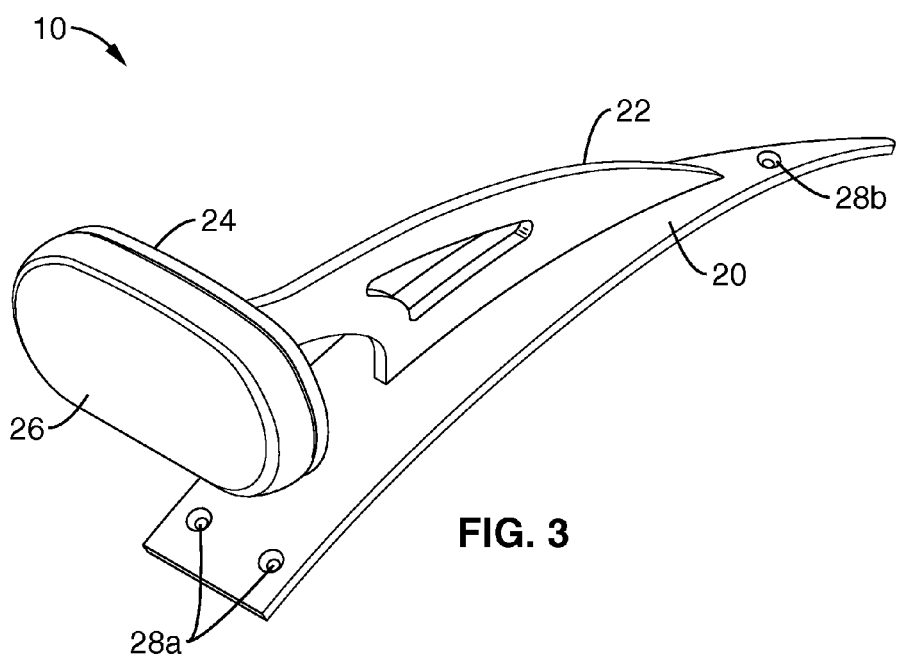
FIG. 3 is a perspective view of an embodiment of a back support assembly of the present invention.
Figure 4:
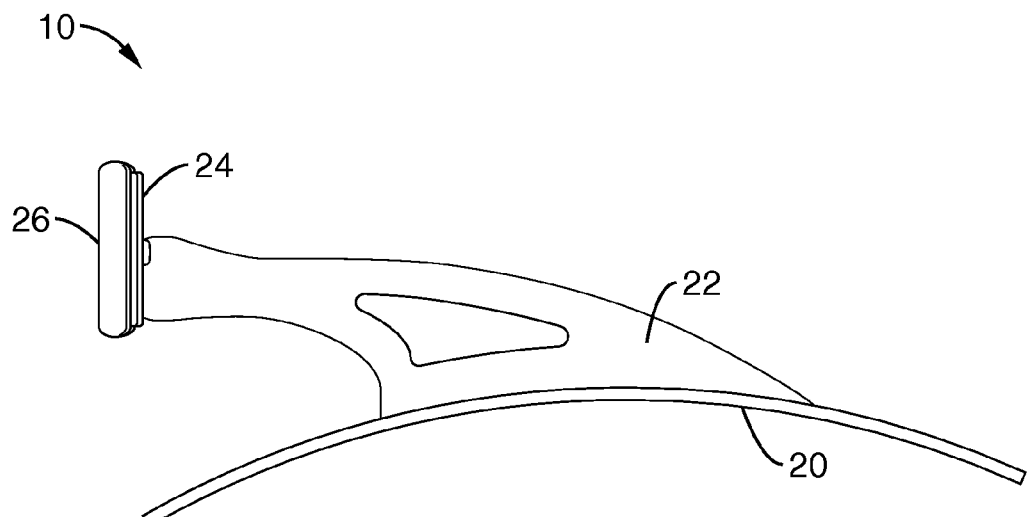
FIG. 4 is a side view of an embodiment of a back support assembly of the present invention.

Referring to FIGS. 3-4, the back support assembly 10 has four main pieces: a bottom mounting plate 20, a backbone 22, a back support 24, and a cushion pad 26. Each piece is not limited to the specific embodiments shown in the drawings, but may be of other designs consistent with the specification and claims. For example, mounting plates 20 can be made in dimensions and geometries complemental to rear fender geometries for a variety of motorcycle makes and models, both stock and custom, without departing from the present invention.

Referring also to FIG. 3, the bottom plate 20 preferably has two front mounting holes 28a, a rear mounting hole 28b, and preferably exhibits a taper from the front portion to the rear portion, terminating in a point beyond the rear mounting hole 28b. The mounting holes 28a, 28b can be countersunk, such that the fastener head is flush with the top of the mounting plate 20 when installed. The bottom plate 20 is curved to match the radius of a back fender 14 in both front-to-rear and side-to-side directions. As noted, rear fenders 14 on some motorcycle models have stock holes in the positions corresponding to the front and rear mounting holes 28a, 28b on the bottom plate 20, with the holes corresponding to the front mounting holes 28a often located under the seat. Alternatively, holes can be drilled through the fender 14 to accommodate the back support assembly 10 if they are not pre-drilled, if a larger seat is installed, or for any other reason requiring different hole placement.

The backbone 22 is preferably planar and mounted in a vertical orientation on the mounting plate 20, along the longitudinally central axis that bisects the mounting plate 20 and runs from the front to the rear. The bottom portion of the backbone 22 is machined to match the curvature of the bottom plate 20. The backbone 22 can exhibit a variety of shapes, and contributes to the aesthetic appeal of the back support assembly 10.

Figure 5:
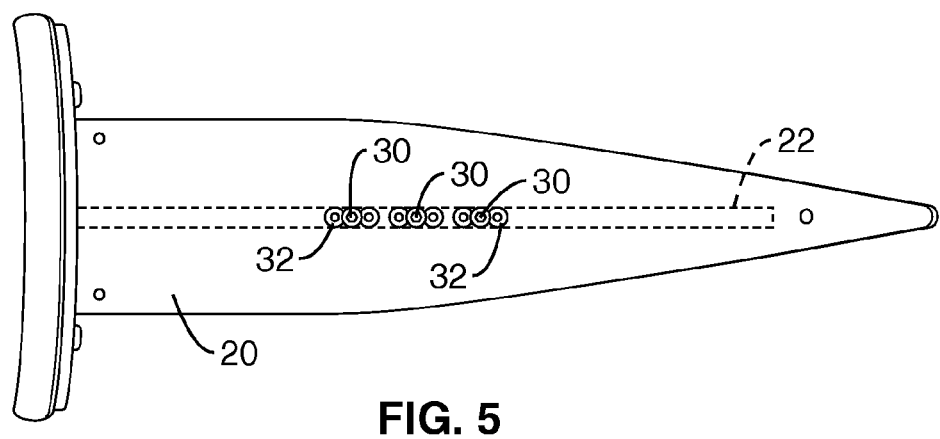
FIG. 5 is a bottom view of an embodiment of a back support assembly of the instant invention.
Figure 6:
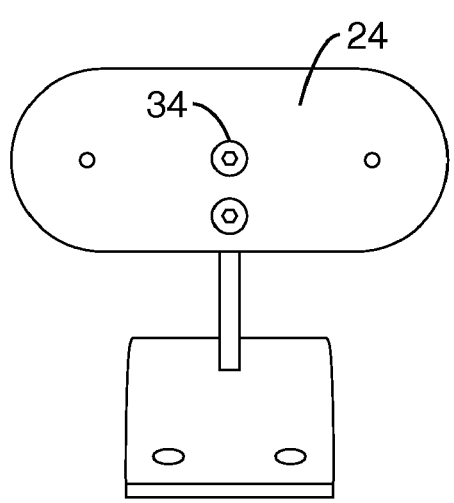
FIG. 6 is an end view of an embodiment of a back support assembly of the instant invention with the cushion pad removed.

Referring to FIG. 5, the backbone 22 is preferably secured across its bottom edge by three mounting bolts or screws 30 through the bottom of the bottom plate 20. When the backbone 22 is secured to the bottom plate 20, it is preferable that the joint be clean, as shown in FIGS. 2-3. The bottom plate 20 preferably has three groups of backbone mounting holes 32. In the embodiment shown in FIG. 5, the backbone 22 is mounted in the middle location in each group of backbone mounting holes 32. Alternatively, the backbone 22 can be mounted in the most forward location or the most rearward location, which changes the relative location of the backbone with respect to the mounting plate and, ultimately, the rider (see, e.g., FIGS. 1A-1C, which show various backbone positions relative to the mounting plate). One skilled in the art will appreciate that the backbone mounting holes 32 can be present in more or fewer groups, or with more or fewer alternative mounting positions. When the backbone 22 is attached to the bottom plate 20, the bolts or screws 30 pass through the bottom surface of the bottom plate 20 and into the backbone 22. The heads of the screws or bolts 30 are preferably flat and flush with or slightly below the surface of the bottom plate 20 to avoid marring the surface of the rear fender 14 (see, e.g., FIG. 4, showing no protrusions from the bottom plate 20).

The backbone 22 is shaped to provide a mounting surface for the back support 24. Like the attachment to the bottom plate 20, the attachment of the backbone 22 to the back support 24 preferably results in a clean joint. The heads of the mounting bolts or screws 34 pass through the back support 24 and are preferably flat and flush with or slightly below the surface of the back support 24, shown in FIG. 6. The back support 24 can be made in standard sizes or can be custom sized to a rider, if desired.

Figure 7:
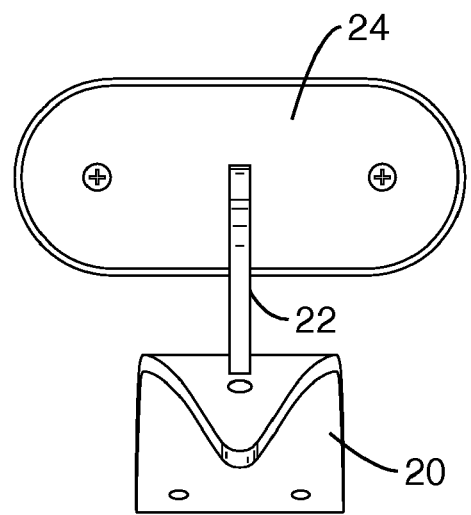
FIG. 7 is an end view, from the opposite end from that shown in FIG. 6, of an embodiment of a back support assembly of the instant invention with the cushion pad attached.
Figure 8:
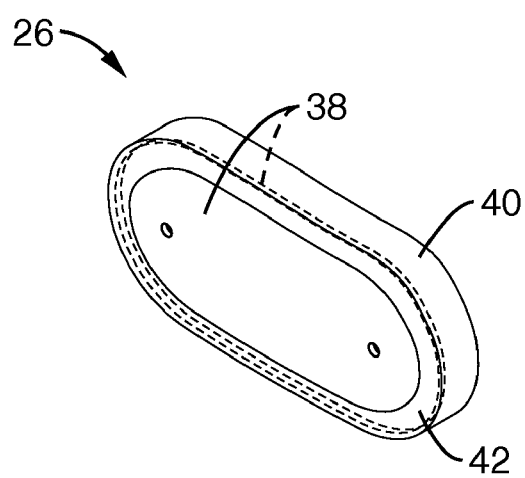
FIG. 8 shows a cushion pad according to an embodiment of the present invention.

Referring to FIGS. 7-8, a cushion pad 26, sized to match the back support 24, is secured to the back support 24, preferably using bolts or screws 36 extending through the back support 24. The cushion pad 26 preferably has a rigid portion 38, a cushioning material 40 adjacent to the rigid portion, and a covering 42 that envelops both the rigid portion 38 and the cushioning material 40. The cushioning material 40 can be provided in standard thicknesses, or available in custom thicknesses tailored to the rider's comfort. The cushion pad 26 is contoured to support the back of the rider and available in different sizes to complement the back support 24. If the cushion pad 26 becomes worn or is damaged, it is easily replaced. The covering 42 can be secured to the rigid material 38 in a variety of ways, and the invention is not limited to wrapping the covering 42 about the edge of the rigid portion 38 and subsequent attachment. The covering 42 can be any material, but is preferably leather or leather-like, waterproof, and can be chosen to match the styling, color, or other accessories of the motorcycle. The exposed surface of the rigid portion 38 can be further secured to the back support 24, if desired, using other seals or adhesives between the back support 24 and the rigid portion 38 of the cushion pad 26, in addition to using the bolts or screws 36.

Preferably, the bottom plate 20, backbone 22, back support 24, and rigid portion 38 of the support pad 26 are of all-billet aluminum construction, but it will be appreciated that other materials may be chosen to complement the motorcycle or styling. Many riders collect and display their motorcycles, and the back support assembly of the present invention is easy to install and remove; is aesthetically pleasing and complemental to the inherent styling of the motorcycle when installed, and does not damage the surface of the motorcycle if removed.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An attachment for a motorcycle, comprising:
    an elongate base with a top surface and a bottom surface shaped to match the curvature of a rear fender of a motorcycle, the base having a long central axis;
    a substantially planar backbone having top and bottom edges and distal and proximal ends, the top edge substantially horizontal at the distal end and the top edge converging with the bottom edge at the proximal end, the bottom edge of the backbone mounted to the elongate base along the long central axis of the elongate base and in a perpendicular orientation relative to the elongate base; and
    a support member coupled to the distal end of the backbone in a substantially perpendicular orientation to the long axis of the elongate base and the plane of said backbone.

2. An attachment as recited in claim 1, further comprising: means for mounting the elongate base to a motorcycle.

3. An attachment as recited in claim 2, wherein said means for mounting the elongate base to a motorcycle comprises mounting bolts.

4. An attachment as recited in claim 1:
    wherein said support member comprises a plate coupled to said proximal end of said backbone and a detachable pad configured to removably couple with the plate.

5. An attachment as recited in claim 4:
    wherein said detachable pad is oval shaped.

6. An attachment as recited in claim 4:
    wherein said detachable pad comprises a rigid portion, padding and a material covering.

7. An attachment as recited in claim 4:
    wherein said detachable pad is contoured to support the back of a rider.

8. An attachment as recited in claim 1:
    wherein said substantially planar backbone is removably mounted to said elongate base with fasteners; and
    wherein the backbone can be positioned and fixed to the long central axis of the elongate base.

* * * * *